US011395254B2

United States Patent
Van Laere

(10) Patent No.: US 11,395,254 B2
(45) Date of Patent: Jul. 19, 2022

(54) CELLULAR ALERTING ADD-ON

(71) Applicant: Maarten Van Laere, Heverlee (BE)

(72) Inventor: Maarten Van Laere, Heverlee (BE)

( * ) Notice: Subject to any disclaimer, the term of this patent is extended or adjusted under 35 U.S.C. 154(b) by 0 days.

(21) Appl. No.: 16/249,750

(22) Filed: Jan. 16, 2019

(65) Prior Publication Data

US 2019/0223146 A1 Jul. 18, 2019

Related U.S. Application Data

(60) Provisional application No. 62/617,761, filed on Jan. 16, 2018.

(51) Int. Cl.
*H04W 4/00* (2018.01)
*H04W 68/00* (2009.01)
*H04W 4/38* (2018.01)
*H04W 4/20* (2018.01)
*H04M 1/72409* (2021.01)

(52) U.S. Cl.
CPC ..... *H04W 68/005* (2013.01); *H04M 1/72409* (2021.01); *H04W 4/20* (2013.01); *H04W 4/38* (2018.02)

(58) Field of Classification Search
CPC ....... H04W 68/005; H04W 4/38; H04W 4/20; H04W 68/00; H04M 1/72419; H04M 1/72409; H04M 2250/12
USPC .................................... 455/426.1, 550.1, 418
See application file for complete search history.

(56) References Cited

U.S. PATENT DOCUMENTS

| | | | | |
|---|---|---|---|---|
| 6,717,529 B1 * | 4/2004 | Belvin | ................... | G08B 25/10 340/870.16 |
| 7,526,539 B1 * | 4/2009 | Hsu | ....................... | H04W 24/08 709/224 |
| 7,623,028 B2 * | 11/2009 | Kates | ..................... | F24F 7/007 340/521 |
| 7,902,966 B1 * | 3/2011 | Beitelmal | ............... | G06F 1/206 340/12.32 |
| 10,610,111 B1 * | 4/2020 | Tran | ....................... | G08B 25/10 340/521 |
| 2004/0203429 A1 * | 10/2004 | Anderson | ............. | H04W 64/00 455/67.11 |
| 2005/0148890 A1 * | 7/2005 | Hastings | ................. | G16H 40/67 600/509 |
| 2005/0262519 A1 * | 11/2005 | Luebke | ............ | G08B 13/19684 719/318 |
| 2005/0275227 A1 * | 12/2005 | Ahn | ........................ | B60R 19/24 293/155 |

(Continued)

FOREIGN PATENT DOCUMENTS

WO WO-2008099384 A2 * 8/2008 ........... G06F 1/1626
WO WO-2015056928 A1 * 4/2015 ............. G06F 1/163

*Primary Examiner* — Mahendra R Patel
(74) *Attorney, Agent, or Firm* — White-Welker & Welker, LLC; Matthew T. Welker, Esq.

(57) ABSTRACT

The cellular alerting add-on device is a device for providing sensor platforms with a new innovative way to transmit alerts, information and any other form of data using cellular networks and this by utilizing existing connectivity capabilities between base units and sensors. The cellular alerting add-on device generally includes one or more cellular alerting sensors that are connected in a wired or wireless way with the base unit. The sensors can perform wireless communications like sending out SMS alerts, email alerts, SNMP traps and other communications like, but not limited to, IoT communications.

18 Claims, 2 Drawing Sheets

(56) References Cited

U.S. PATENT DOCUMENTS

| | | | | |
|---|---|---|---|---|
| 2005/0275228 A1* | 12/2005 | Davis | E01H 1/1206 | 294/1.3 |
| 2005/0278519 A1* | 12/2005 | Luebke | G04F 1/005 | 713/1 |
| 2007/0032219 A1* | 2/2007 | Rudolf | H04M 11/04 | 455/404.1 |
| 2007/0063833 A1* | 3/2007 | Kates | G08B 25/10 | 340/521 |
| 2007/0174152 A1* | 7/2007 | Bjornberg | G01C 15/00 | 705/28 |
| 2008/0042809 A1* | 2/2008 | Watts | B60R 25/1003 | 340/426.16 |
| 2010/0145479 A1* | 6/2010 | Griffiths | H04L 67/12 | 700/17 |
| 2011/0055748 A1* | 3/2011 | Vacariuc | G05B 15/02 | 715/771 |
| 2012/0190325 A1* | 7/2012 | Abu-Hakima | H04L 63/062 | 455/404.2 |
| 2012/0206259 A1* | 8/2012 | Gassaway | G08B 25/016 | 340/540 |
| 2013/0222141 A1* | 8/2013 | Rhee | G06F 19/3418 | 340/573.3 |
| 2013/0279413 A1* | 10/2013 | Cote | H04L 45/22 | 370/328 |
| 2014/0119706 A1* | 5/2014 | Chang | H04N 5/772 | 386/224 |
| 2014/0175435 A1* | 6/2014 | Yamazaki | H01L 29/45 | 257/43 |
| 2015/0023341 A1* | 1/2015 | Zhao | H04W 48/18 | 370/338 |
| 2016/0313909 A1* | 10/2016 | Choy | G06F 3/04845 | |
| 2017/0199836 A1* | 7/2017 | Bevan | G06F 1/184 | |

* cited by examiner

CELLULAR ALERTING ADD-ON

CROSS REFERENCE TO RELATED APPLICATIONS

This application claims priority from U.S. patent application Ser. No. 62/617,761, entitled "Cellular Alerting Add-on", filed on 16 Jan. 2018. The benefit under 35 USC § 119 of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE PRESENT INVENTION

The present invention relates generally to cellular network connectivity for sensor platforms. More specifically, the present invention relates to a device enabling one or more sensor platforms to transmit alert(s), notification(s), information and any other form of data using cellular networks and this by connecting to one or more base units using one or more sensor connection ports.

BACKGROUND OF THE PRESENT INVENTION

Sensor platforms have been capable for a long time to alert and/or transmit data using cellular or wireless WAN networks (hereinafter "cellular networks") such as, but not limited to, GSM (2G/3G/4G,5G), CDMA, LTE-M, NB-IOT, Sigfox, LoRa.

There are three ways in which cellular network connectivity has been enabled and made available for sensor platforms: (1) using of a cellular or mobile network modem in front of the base unit that translates standard network communication into communications that can be sent over cellular networks; acting in a commonly known way as a "wireless router"; (2) connecting a modem through a provisioned connector or port on the base unit; typically labelled as a modem or wireless port; and (3) having a cellular network communication module built-into the base unit These known devices and methods have several disadvantages compared to the present invention that teaches a new, easier and more secure way of connecting sensor platforms to cellular networks.

SUMMARY OF THE PRESENT INVENTION

The present invention relates to a device enabling one or more sensor platforms to transmit alert(s), notification(s), information and any other form of data using cellular networks and this by connecting to one or more base units using one or more sensor connection ports.

There has thus been outlined, rather broadly, some of the features of the present invention in order that the detailed description thereof may be better understood, and in order that the present contribution to the art may be better appreciated. There are additional features of the present invention that will be described hereinafter.

In this respect, before explaining at least one embodiment of the present invention in detail, it is to be understood that the present invention is not limited in its application to the details of construction or to the arrangements of the components set forth in the following description or illustrated in the drawings. The present invention is capable of other embodiments and of being practiced and carried out in various ways. Also, it is to be understood that the phraseology and terminology employed herein are for the purpose of the description and should not be regarded as limiting.

An objective of the present invention is to provide a device enabling sensor platforms in an innovative way using cellular networks to transmit alerts, notifications, information and/or any other form of data or any combination thereof.

Another objective of the present invention is to provide a device that connects directly or indirectly to one or more sensor platform base unit(s) using one or more available sensor ports on either the base unit(s) or on an extension unit of the sensor base units. This enables the use of the cellular alerting add-on device in sensor platforms without the need of designing special ports to enable cellular communications.

Another objective of the present invention is to provide backwards compatibility. This means to be able to implement the cellular alerting add-on device into existing sensor platforms by plugging the device into a sensor port of the base unit. If the base unit doesn't support the functionality yet, then support for the present invention could be added through a simple firmware update.

Another objective of the present invention is to provide a device with the capability to connect to one or more cellular networks. This provides the device taught by the present invention with fail-over and redundancy capabilities in the event of one or more cellular network outages.

Another objective of the present invention is to provide a device that is designed in such a way that cellular network communications are physically isolated and shielded from internal networks to which a base unit is connected to. This provides increased security as possible attacks originating from cellular networks are limited to the present invention and can not expose internal networks to the outside world.

Another objective of the present invention is to provide a device that can be placed in a different location than the base unit to improve cellular network connectivity. Especially in use cases where cellular network reception may be limited. Indeed the cable used between the base unit and the cellular alerting add-on device can be of greater length than that of a traditional antenna.

Other objectives and advantages of the present invention will become obvious to the reader and it is intended that these objectives and advantages are within the scope of the present invention. To the accomplishment of the above and related objectives, the present invention may be embodied in the form illustrated in the accompanying drawings, attention being called to the fact, however, that the drawings are illustrative only, and that changes may be made in the specific construction illustrated and described within the scope of this application.

BRIEF DESCRIPTION OF THE DRAWINGS

The accompanying drawings, which are incorporated herein and form a part of the specification, illustrate the present invention and, together with the description, further serve to explain the principles of the present invention and to enable a person skilled in the pertinent art to make and use the present invention.

INDEX OF ELEMENTS

Figure 1:
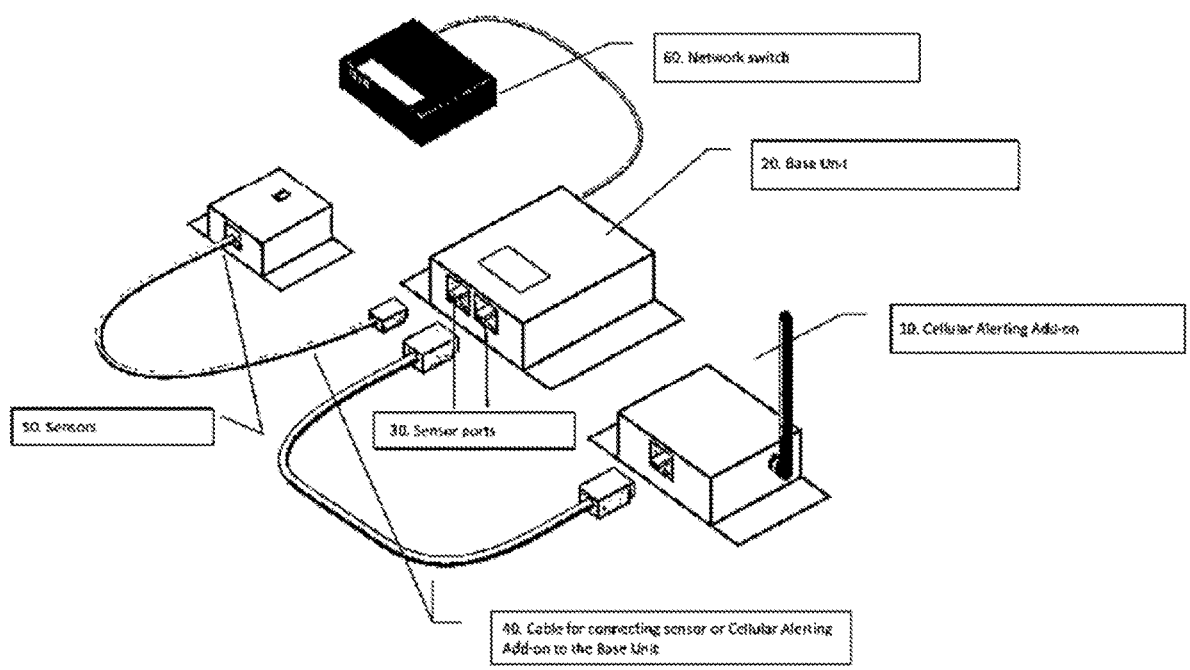
FIG. 1 illustrates a drawing of one possible implementation of the present invention wherein a first cellular alerting add-on device is connected via a cable to a first sensor port on the base unit and a second sensor is connected to a second port of the base unit.
Figure 2:
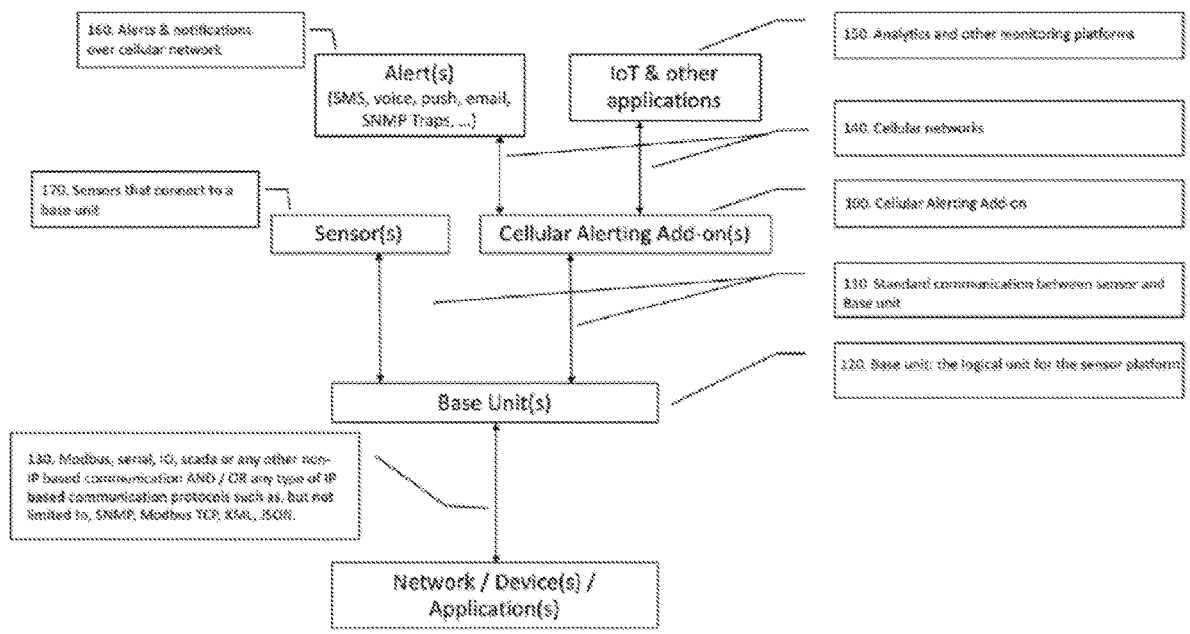
FIG. 2 is a flowchart illustrating the overall operation of the present invention.

FIG. 1.
  10: The cellular alerting add-on device
  20: Base unit for sensor(s)
  30: Sensor port(s)
  40: RJ45 cables used to connect sensor(s) or cellular alerting add-on device to the base unit
  50: Sensor
  60: Network switch with a network cable connecting the base unit to the switch FIG. 2.
  100: Cellular alerting add-on device
  110: Connection between sensor(s), cellular alerting add-on device and base unit
  120: Base unit for the sensor(s)
  130: Communication from the base unit with other system(s), network(s), device(s) and application(s) or any combination thereof.
  140: Cellular network(s) such as but not limited to GSM (2G/3G/4G/5G), CDMA, LTE-M, NB-IOT, Sigfox and LoRa
  150: Analytics and/or other monitoring platform(s)
  160: Alert(s), notification(s) over cellular network(s) to device(s), system(s), application(s)
  170: Sensor(s) used in a sensor platform Definitions An application is any program, or group of programs, that is designed for the end user. Application software can be divided into two general classes: systems software and applications software. Applications software (also called end-user programs) includes such things as database programs, word processors, Web browsers and spreadsheets.

Base Unit: the base unit is part of a sensor platform and is the logical unit with typically more computational, energy and communication resources. Using its computational capabilities it can transform, aggregate or process the data from the sensors in any possible form as designed and make it available to the end-user or other systems using a wide range of communication protocols. As such it acts as a gateway between sensors and the network to which end-users, devices, systems and applications are also directly or indirectly connected to. In some configurations it can also provide power to the sensors.

Cellular network: a cellular network is a communication network where the last link is wireless. The network is distributed over land areas called cells, each served by at least one fixed-location transceiver. The network supports the transmission of voice calls and data. It is widely implemented as GSM networks where GSM stands for Global System for Mobile communication, a European standard for networks first deployed in Europe in 1991. The cellular network is commonly identified by the mobile operator who operates the network and the cellular technology (1G/2G/3G/4G/5G/LTE-M/NB-IOT) being used. Cellular networks can also be non GSM based networks where proprietary or non-proprietary communication systems are used. A non-limitative example list of common non-GSM networks are CDMA, Sigfox, LoRa and Wimax.

IoT. The internet of things, or IoT, is a system of interrelated computing devices, mechanical and digital machines, objects, animals or people that are provided with unique identifiers (UIDs) and the ability to transfer data over a network without requiring human-to-human or human-to-computer interaction.

Middleware is a hardware or software solution that sits between a base unit and an application. It could simply act as a pass-through, can perform operations on the data from the base unit (like but not limited to: pass-through, conversion, aggregation).

A computer network or data network is a telecommunications network which allows computers to exchange data. In computer networks, networked computing devices exchange data with each other using a data link. The connections between nodes are established using either cable media or wireless media. The best-known computer network is the Internet. Computer networks differ in the transmission medium used to carry their signals, communications protocols to organize network traffic, the network's size, topology and organizational intent. Computer networks support an enormous number of applications and services such as access to the World Wide Web, digital video, digital audio, shared use of application and storage servers, printers, and fax machines, and use of email and instant messaging applications as well as many others. In most cases, application-specific communications protocols are layered (i.e. carried as payload) over other more general communications protocols.

A platform is any hardware or software used to host an application or service. An application platform, for example, a monitoring platform, consists of hardware, an operating system and coordinating programs that use the instruction set for a particular processor or microprocessor.

DETAILED DESCRIPTION OF THE PRESENT INVENTION

In the following detailed description of the present invention of exemplary embodiments of the present invention, reference is made to the accompanying drawings (where like numbers represent like elements), which form a part hereof, and in which is shown by way of illustration specific exemplary embodiments in which the present invention may be practiced. These embodiments are described in sufficient detail to enable those skilled in the art to practice the present invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the present invention. However, it is understood that the present invention may be practiced without these specific details. In other instances, well-known structures and techniques known to one of ordinary skill in the art have not been shown in detail in order not to obscure the present invention. Referring to the figures, it is possible to see the various major elements constituting the apparatus of the present invention.

Now referring to the Figures, in which similar reference characters denote similar elements throughout the several views, the figures illustrate a cellular alerting add-on device. Turning now descriptively to the drawings, in which similar reference characters denote similar elements throughout the several views, FIG. 1 illustrates one cellular alerting add-on device (10) being connected using a wired connection (40) to a sensor port (30) of the base unit (20). The cellular alerting add-on device transmits alerts, notifications (160), information and/or any other form of data to systems, devices, applications (150) using cellular networks (140).

The cellular alerting add-on device is designed to enable the transmission of alerts, notifications (160) information and/or other forms of data (150) by the sensor platform using cellular networks (140) while being connected in any way to a sensor port (110) on the base unit (20) or on an expansion unit of the base unit.

Primary use of the cellular alerting add-on device is to send out alerts and notifications over the cellular network. Examples of alert and notifications are, but not limited to, SMS messages, voice calls, email, push notifications and SNMP Traps.

The cellular alerting add-on device can also be used to send non-alerting and non-notification data to other devices, servers, or applications. Typical non limitative examples of such applications would be sensor management platforms that enable to centrally monitor, report, and alert (or any combination thereof) sensors that are connected in cellular networks. Those are commonly referred to as IoT platforms. However, applications are not limited IoT.

The following is a non-limitative list of other applications: network monitoring systems, infrastructure monitoring software, security systems, DCIM, relational and non-relational databases, analytics systems, Scada, industrial automation, building management systems. In the present invention applications may also refer to middleware. Middleware is a hardware or software solution that sits between the cellular alerting add-on device and the application. It could simply act as a pass-through, can perform operations (like but not limited to conversion, aggregation) on the data from the base unit and sent by the cellular alerting add-on device. The devices could be handheld devices such as, but not limited to, mobile phones, tablets, portable or desktop computers.

Typically the base unit in a sensor platform is a logical device to which one or more sensors can be connected to. The base unit can either work stand-alone or be connected in its turn to other applications, servers, systems or any other type of device.

In a wired sensor platform, sensors connect to the base unit using a cable that is plugged into ports for sensors on the base units. Some base units have the option to expand the number of ports by using an expansion unit; this increases the number of ports that sensors can connect to.

The communication protocol between a wired sensor and base unit is typically not a data network based protocol such as TCP/IP but more often an industrial open or proprietary communication protocols and methods such as, but not limited to, RS232 or RS485. The cable (40) used between sensor (50) and base unit (20) transmits the data between sensor and the base unit and it can also transmit power either way. A non-limitative example of common cables for this purpose are RJ45 and RJ11 data cables. In the drawings, as illustrative, the cable (40) used is an RJ45 network cable as shown.

The cellular alerting add-on device transmits alerts, notifications (160), information and any other form of data (150) over cellular networks (also called mobile networks) (140) such as, but not limited to, GSM (2G/3G/4G,5G), CDMA, LTE-M, NB-IOT, Sigfox, LoRa. The connection to such cellular networks by the cellular alerting add-on device (100) can either be used as a primary, dual, or backup connection mode or any combination thereof.

In a primary mode, the cellular alerting add-on device will act as the primary method of transmitting alerts, notifications, information, or any other form of data as opposed to use a wired or wireless data network to which base units could connect to.

In a dual mode, alerts, notifications, information, and/or any form of data can be transmitted through the cellular alerting add-on device or through the wired data connection either based on user or programmatic configuration.

In a backup configuration, the cellular alerting add-on device will only be used when the primary connection (130) (typically a TCP/IP network) fails or is not working as expected. In a backup setup the cellular alerting add-on device ensures that alerts, notifications, information or any other form of data is still being sent. The cellular alerting add-on device could also be configured such that a mix is used of standard connection (130) and cellular connection (140) depending on the type of alert, notification, information, or other form of data or in combination with any possible criteria. For example it could be configured to only use SMS alerts at specific times of a day and for a specific type of alert or problem detected.

The cellular alerting add-on device can be configured to support one or more cellular networks, network types, and mobile operators. For example, but not limited to, the cellular alerting add-on device could be configured to use a 3G network using one mobile operator and a LoRa network using a different provider.

How alerts, information, or any other form of data is transmitted can either be defined by the base unit (120) based on programming logic and/or user settings or in the cellular alerting add-on device (100) using programming logic and/or user settings or any combination thereof.

Cellular networks cause a potential risk for users of sensor platforms especially when such platforms are also connected to internal data network(s). In such cases the connectivity of a sensor platform to a public network using the cellular data network could enable non authorized activity on internal data networks. This has been demonstrated through connected objects (Internet of Things or IoT) that have enabled hackers to gain access to internal systems by breaking into those connected objects.

In the present invention the communication between the cellular alerting add-on device (100) and the base unit (120) is enabled using the same or similar connection (140) as the base unit uses to communicate with sensors. As those are typically (dumb) industrial communication protocols between sensors and base units that do not contain any executable code. In such cases attacks originating from the cellular network will be confined to the cellular alerting add-on device (100) and not the base unit (120); thus preserving the integrity of the internal networks (60).

A typical implementation of the present invention would be a device that includes the features as described above. This device (10) would then connect, directly or indirectly, using a wired connection (40) into a port (30) on the base unit (20) that is provisioned to support sensors.

An alternative embodiment of the present invention is when the connection of a sensor (170) and a base unit (120) is a wireless connection (140). In that case the present invention would use the same communication methodology as between sensor(s) and one or more base units (110).

Non-limitative examples of such wireless connections are BLUETOOTH, and ZIGBEE.

Another alternative embodiment of the present invention is to have the cellular alerting add-on device not connect to one base unit (20) but instead enable it to connect to multiple base units at the same time so that the cellular alerting add-on device brings the above described transmission capabilities to multiple base units and this while only requiring one cellular alerting add-on device (10).

Typically customers would need to install a mobile data router in front of the base unit or the base unit would need to have a port available for connecting a cellular network modem (modem). At best a vendor would have a modem already embedded into the base unit. This has a lot of disadvantages compared to the present invention.

The preferred operation of the present invention is illustrated in FIG. 1. The cellular alerting add-on device is designed to leverage an existing connectivity between sensors (50) and base units (30 and 40). With cellular alerting add-on device no hardware changes are needed onto base units (20) to support the transmission of alerts, notifications, information, and/or any other form of data using cellular networks.

By not embedding the cellular hardware into the base unit, the present invention can be placed in different locations compared to the base unit for improved reception as the cable length between a sensor and a base unit can often by substantially longer than a traditional antenna.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

Thus, it is appreciated that the optimum dimensional relationships for the parts of the present invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the present invention should be determined by the appended claims and their legal equivalents, rather than by the examples given.

The embodiments of the present invention in which an exclusive property or privilege is claimed are defined as follows:

1. A sensor platform comprising:
   one or more base units;
     each base unit having one or more sensor ports;
   a cellular alerting add-on device connected using a wired connection to the base unit via the sensor port;
   wherein the cellular alerting add-on device is configured such that a mix of standard connection and cellular connection are used, depending on the type of alert, notification, information, data, or in combination with one or more possible criteria assigning a connection based on data type;
   in a wired sensor platform, sensors connect to the base unit using a cable that is plugged into ports for sensors on the base units; and
   base units have the option to expand the number of orts by using an expansion unit, thereby increasing the number of orts that sensors connect to and enables the transmission capabilities to multiple base units;
   a communication protocol between a wired sensor and base unit is an industrial communication protocol;
   the cable used between sensor and base unit transmits the data between sensor and the base unit and the cable transmit bi-directional power;
   the cellular alerting add-on device is configured to support one or more cellular networks, network types, and mobile operators; and
   alerts, and information are transmitted as defined by,
     the base unit using programming logic, and user settings; and
     the cellular alerting add-on device using programming logic, and user settings.

2. The sensor platform of claim 1, wherein
   the cellular alerting add-on device transmits alerts, notifications, and information to systems, devices, and applications using one or more cellular networks.

3. The sensor platform of claim 1, further comprising
   an expansion unit having one or more sensor ports connected to a base unit; and
   the cellular alerting add-on device connected to a sensor port on the base unit or on an expansion unit of the base unit.

4. The sensor platform of claim 1, wherein
   the cellular alerting add-on device sends out alerts and notifications over the cellular network.

5. The sensor platform of claim 4, wherein
   alert and notifications are one or more from the list of:
   SMS messages,
   voice calls,
   emails, push notifications, and
   SNMP Traps.

6. The sensor platform of claim 1, wherein
   the cellular alerting add-on device sends out non-alerting and non-notification data to other devices, servers, or applications.

7. The sensor platform of claim 6, wherein
   non-alerting and non-notification data are one or more from the list of:
   analytics systems,
   IOT systems,
   network monitoring systems,
   infrastructure monitoring systems,
   security systems,
   relational and non-relational databases,
   DCIM,
   Scada,
   industrial automation, and
   building management systems.

8. The sensor platform of claim 7, wherein
   applications refer to middleware, and
   middleware is a hardware solution that sits between the cellular alerting add-on device and the application; and
   middleware acts as a pass-through, and perform operations on the data from the base unit and sent by the cellular alerting add-on device.

9. The sensor platform of claim 1, wherein
   the base unit in a sensor platform is a logical device to which one or more sensors are connected to; and the base unit either works stand-alone or connected in its turn to other applications, servers, systems, or electronic devices.

10. The sensor platform of claim 1, wherein
the cellular alerting add-on device transmits alerts, notifications, and information over cellular networks; and
the connection to the cellular networks by the cellular alerting add-on device is either as a primary, dual, or backup connection mode.

11. The sensor platform of claim 10, wherein
cellular networks are one or more from the list of:
GSM (2G/3G/4G/5G),
CDMA,
LTE-M,
NB-IOT,
Sigfox, and
LoRa.

12. The sensor platform of claim 10, wherein
in a primary mode, the cellular alerting add-on device acts as the primary method of transmitting alerts, notifications, and information as opposed to use a wired or wireless data network to which base units could connect to.

13. The sensor platform of claim 10, wherein
in a dual mode, alerts, notifications, and information are transmitted through the cellular alerting add-on device or through the wired data connection either based on user or programmatic configuration.

14. The sensor platform of claim 10, wherein
in a backup configuration, the cellular alerting add-on device will only be used when the primary connection fails or is not working as expected; and
in a backup setup, the cellular alerting add-on device ensures that alerts, notifications, and information are still being sent.

15. The sensor platform of claim 1, wherein
the communication between the cellular alerting add-on device and the base unit is enabled using the same or similar connection as the base unit uses to communicate with sensors.

16. The sensor platform of claim 15, wherein
the cellular alerting add-on device connects, directly or indirectly, using a wired connection into a port on the base unit that is provisioned to support sensors.

17. The sensor platform of claim 15, wherein
when the connection of a sensor and a base unit is a wireless connection, the cellular alerting add-on device connects using the same communication methodology as between sensor(s) and one or more base units.

18. The sensor platform of claim 15, wherein
the cellular alerting add-on device connects to multiple base units at the same time so that the cellular alerting add-on device enables the transmission capabilities to multiple base units, while only requiring one cellular alerting add-on device.

* * * * *